United States Patent
Scott et al.

(10) Patent No.: US 8,146,010 B2
(45) Date of Patent: Mar. 27, 2012

(54) COMBINABLE TABS FOR A TABBED DOCUMENT INTERFACE

(75) Inventors: Matthew R. Scott, Beijing (CN); Chen Zhao, Beijing (CN); Gonglue Jiang, Beijing (CN); Fang Zou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 12/362,459

(22) Filed: Jan. 29, 2009

(65) Prior Publication Data

US 2010/0115450 A1    May 6, 2010

Related U.S. Application Data

(60) Provisional application No. 61/110,902, filed on Nov. 3, 2008.

(51) Int. Cl.
*G06F 3/048* (2006.01)
(52) U.S. Cl. .................. 715/771; 715/777
(58) Field of Classification Search .......... 715/771, 715/777
See application file for complete search history.

(56) References Cited

U.S. PATENT DOCUMENTS

| | | | |
|---|---|---|---|
| 5,668,964 | A | 9/1997 | Helsel et al. |
| 6,166,736 | A | 12/2000 | Hugh |
| 6,321,241 | B1 | 11/2001 | Gartung et al. |
| 6,944,829 | B2 | 9/2005 | Dando et al. |
| 2002/0193066 | A1* | 12/2002 | Connelly ............... 455/2.01 |
| 2005/0102630 | A1 | 5/2005 | Chen et al. |
| 2006/0206834 | A1* | 9/2006 | Fisher et al. ............ 715/777 |
| 2007/0113101 | A1* | 5/2007 | LeVasseur et al. ...... 713/189 |
| 2007/0162864 | A1* | 7/2007 | Masselle et al. ........ 715/765 |

OTHER PUBLICATIONS

"Combined multiple and single document interface modes," Opera Software, © 2009 Opera Software ASA, 1 page.
"dhtmlxTabbar :: JavaScript Tab Control," Scand, Exefind software search, © 2005-2006, Exefind.com, 2 pages.
"PDF-XChange," Review Updated for Build 2.0.40.4, 17 pages, http://homepage.ntlworld.com/pesala/Home/html/pdf-xchange.html [last accessed Jan. 28, 2009].
Kerr, Kenny, "Beef Up Windows Apps with the Visual C++ 2008 Feature Pack,"MSDN Magazine, May 2008, © 2008 Microsoft Corporation and CMP Media, LLC, 17 pages, http://msdn.microsoft.com/en-us/magazine/cc507634.aspx [last accessed Jan. 29, 2008].

* cited by examiner

*Primary Examiner* — Tuyetlien Tran
*Assistant Examiner* — Jessica Chuang
(74) *Attorney, Agent, or Firm* — Perkins Coie LLP

(57) ABSTRACT

A method and system for combining tabs of a tabbed document interface ("TDI") is provided. A combinable TDI system allows tabs of a TDI to be combined to form a single tab of the TDI. To combine tabs, the combinable TDI system generates a combined tab name from the tab names of the tabs to be combined and combined tab content from the content of the tabs to be combined. If the width of the content is greater than what can be currently displayed in the window, the combinable TDI system may add a scroll bar to the TDI so that the user can scroll and make visible portions of the content that were previously not visible. The combinable TDI system then displays the combined tab and removes the tabs that have been combined. The combinable TDI system may also allow a user to split a combined tab into separate tabs.

18 Claims, 8 Drawing Sheets

US 8,146,010 B2

COMBINABLE TABS FOR A TABBED DOCUMENT INTERFACE

CROSS REFERENCE TO RELATED APPLICATION

This application claims the benefit of U.S. Provisional Application No. 61/110,902, filed Nov. 3, 2008, and entitled "COMBINABLE TABS FOR A TABBED DOCUMENT INTERFACE," which is incorporated herein in its entirety by reference.

BACKGROUND

The Internet, and especially the World Wide Web ("web"), has made vast amounts of information available to users through their Internet browsers. Although this information is easily accessible to users, there is so much information that it presents problems as users try to identify what information is relevant to their needs. This problem has been referred to as the information explosion problem. Search engine services have been developed to help users find information that is relevant to their needs. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by crawling the web to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

After the search results are displayed to the user, the user can click on a link of the search results to view the content of a web page. The web page, however, may or may not contain the information in which the user is interested. Users will often flip quickly between different web pages and different search results to visually compare the different information of the web pages and the search results to find the information of interest. Since browsers conventionally display each search result and web page in a different window, this flipping involves selecting windows from a history list, selecting backward and forward buttons, selecting separate instances of the browser, and various combinations of such selecting.

Recent implementations of browsers have partially made this flipping task less arduous by providing a tabbed document interface ("TDI"). A TDI allows multiple documents (e.g., web pages) to be stored as separate tabs inside a single browser window. With a TDI, each tab has a tab name portion and a tab content portion. The tab name portion contains identifying information for the tab (e.g., text of a query), and the tab content portion contains the content of a web page (e.g., search results for the query). When a user clicks on a tab (e.g., selecting the tab name portion), the tab content window with the content of the web page is displayed. Users can click on tabs in quick succession to visually rotate between the different web pages to find information that is of interest. Even though a TDI makes the process of flipping through the web pages easier, it is still difficult for a user to compare the information provided by one web page to that provided by another web page. The task of making a detailed comparison between web pages is laborious and non-intuitive because the user needs to review one web page and remember its content while flipping to and viewing another web page.

SUMMARY

A method and system for combining tabs of a tabbed document interface ("TDI") is provided. A combinable TDI system allows tabs of a TDI to be combined to form a single tab of the TDI. A user may indicate that two tabs are to be combined into a single tab by selecting the tabs and indicating that the selected tabs are to be combined. The combinable TDI system generates a combined tab name from the tab names of the tabs to be combined and combined tab content from the content of both tabs to be combined. For example, the combinable TDI system may arrange the contents of the tabs in a left-to-right manner. If the width of the content is greater than what can be currently displayed in the window, the combinable TDI system may add a scroll bar to the TDI so that the user can scroll and make visible portions of the content that were previously not visible. The combinable TDI system then displays the combined tab and removes the tabs that have been combined. The combinable TDI system may also allow a user to split a combined tab into separate tabs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
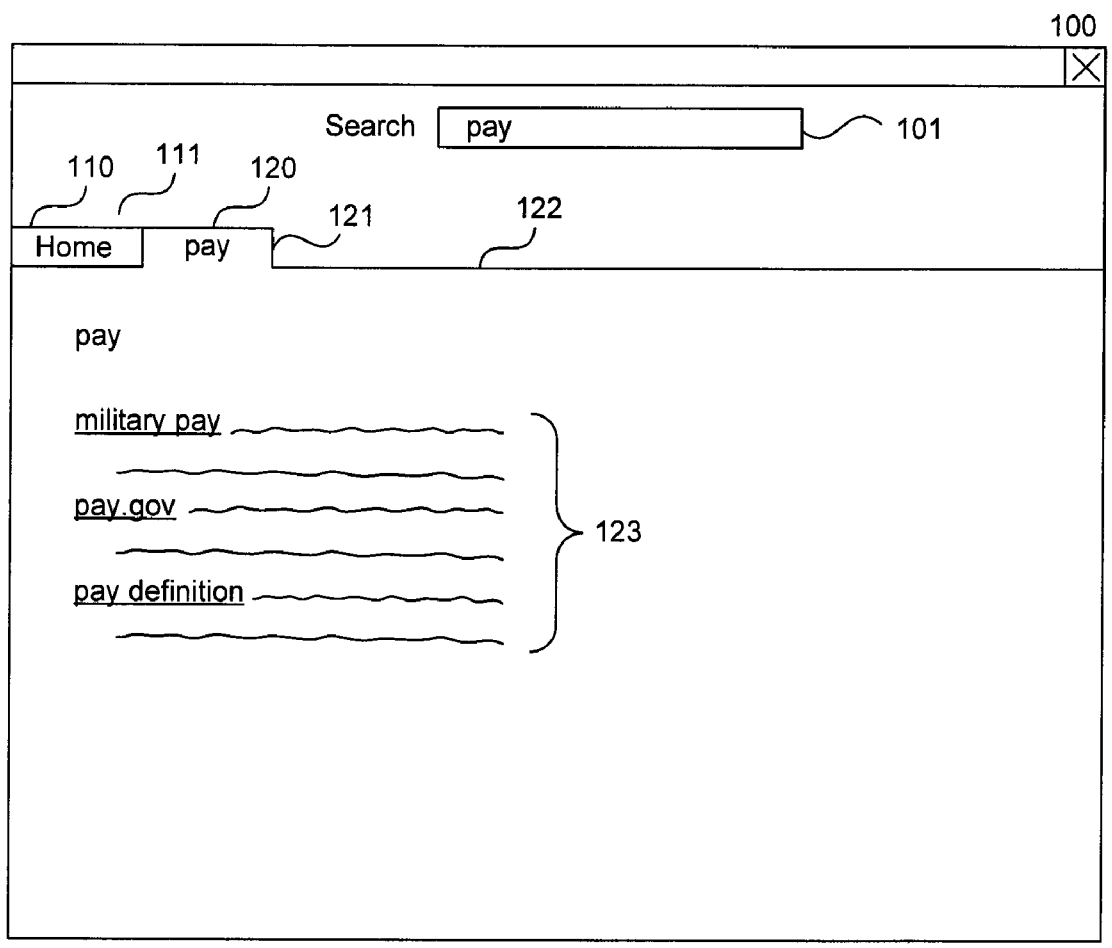
FIG. 1 is a display page that illustrates a TDI with two tabs in some embodiments.

A method and system for combining tabs of a tabbed document interface ("TDI") is provided. In some embodiments, a combinable TDI system allows tabs of a TDI to be combined to form a single tab of the TDI. For example, a search engine service may provide search results for each query to be displayed in a separate tab of the TDI. Upon receiving the results for a query, a browser may create a new tab for its TDI and display the search results in the tab content portion of that tab. A user may indicate that two tabs are to be combined into a single tab by selecting the tabs and indicating that the selected tabs are to be combined. For example, the user may select the tab name portion of one tab and then drag and drop the tab name portion over the tab name portion of another tab. When the combinable TDI system detects that one tab is being dropped over another tab, it generates a new tab with a tab name portion that contains identifying information derived from the tab name portions of the tabs being combined. The combinable TDI system also adds the content of both tabs to the tab content portion of the combined tab. For example, the combinable TDI system may arrange the contents of the tabs in a left-to-right manner. If the width of the content is greater than what can be currently displayed in the window, the combinable TDI system may add a scroll bar to the TDI so that the user can scroll and make visible portions of the content that were previously not visible. The combinable TDI system then displays the combined tab and removes the tabs that have been combined. In this way, a user can combine tabs to view in a single window the tab content portions that were previously in separate tabs.

In some embodiments, the combinable TDI system may allow a user to split a combined tab into two separate tabs. For example, after a user combines tabs and then views the content of the combined tab, the user may want to split the combined tab into two separate tabs. A user may indicate to split a combined tab by selecting the combined tab and selecting a command indicating to split the selected combined tab. Upon detecting that a combined tab should be split, the combinable TDI system generates and displays a separate tab for each of the tabs that were in the combined tab and removes the combined tab.

In some embodiments, the combinable TDI system allows a user to combine more than two tabs into a combined tab. For example, after combining a first and a second tab, a user may drag a third tab over the combined tab, resulting in a combined tab that includes the first, second, and third tabs. The user may then select the combined tab to split the combined tab into three separate tabs.

In some embodiments, the combinable TDI system may arrange the content of a combined tab in different ways. For example, if a combined tab contains the content of four tabs, the content from each of the tabs may be arranged in a row and column format in which the content of one tab is displayed in the upper left portion of the tab content portion, the content of another tab is displayed in the upper right portion, the content of another tab is displayed in the lower left portion, and the content of the last tab is displayed in the lower right portion. The combinable TDI system may add horizontal and vertical scroll bars for scrolling through the content of the combined tab.

FIG. 1 is a display page that illustrates a TDI with two tabs in some embodiments. Display page 100 includes a search area 101, a home tab 110, and a pay tab 120. The home tab includes a tab name portion 111 and a tab content portion that is not currently visible. The pay tab 120 includes a tab name portion 121 and a tab content portion 122. The tab content portion 122 includes a search result portion 123. In this example, the user has selected the tab name portion 121 so that it is the currently selected tab and its contents are currently being displayed. The pay tab 120 may have been created when the search results for the query "pay" were received from a search engine service.

Figure 2:
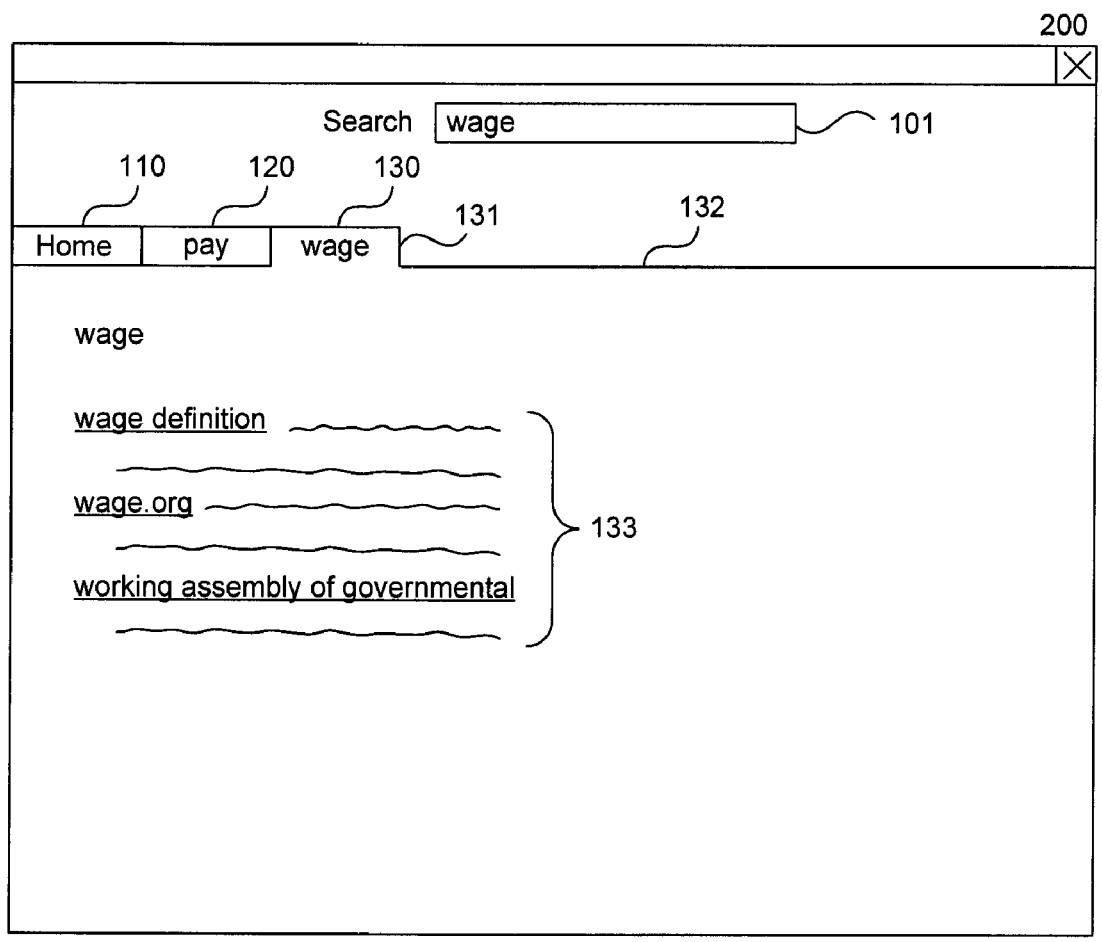
FIG. 2 is a display page that illustrates a TDI with three tabs in some embodiments.

FIG. 2 is a display page that illustrates a TDI with three tabs in some embodiments. Display page 200 includes a search area 101, a home tab 110, a pay tab 120, and a wage tab 130. The wage tab 130 includes a tab name portion 131 and a tab content portion 132. The tab content portion 132 contains a search result 133 provided by a search engine service when requested to perform a search for the search query of "wage." A user may indicate to combine the wage tab 130 with the pay tab 120 by selecting the tab name portion 131 of the wage tab 130 and dragging and dropping the tab name portion 131 over the tab name portion 121 of the pay tab 120.

Figure 3:
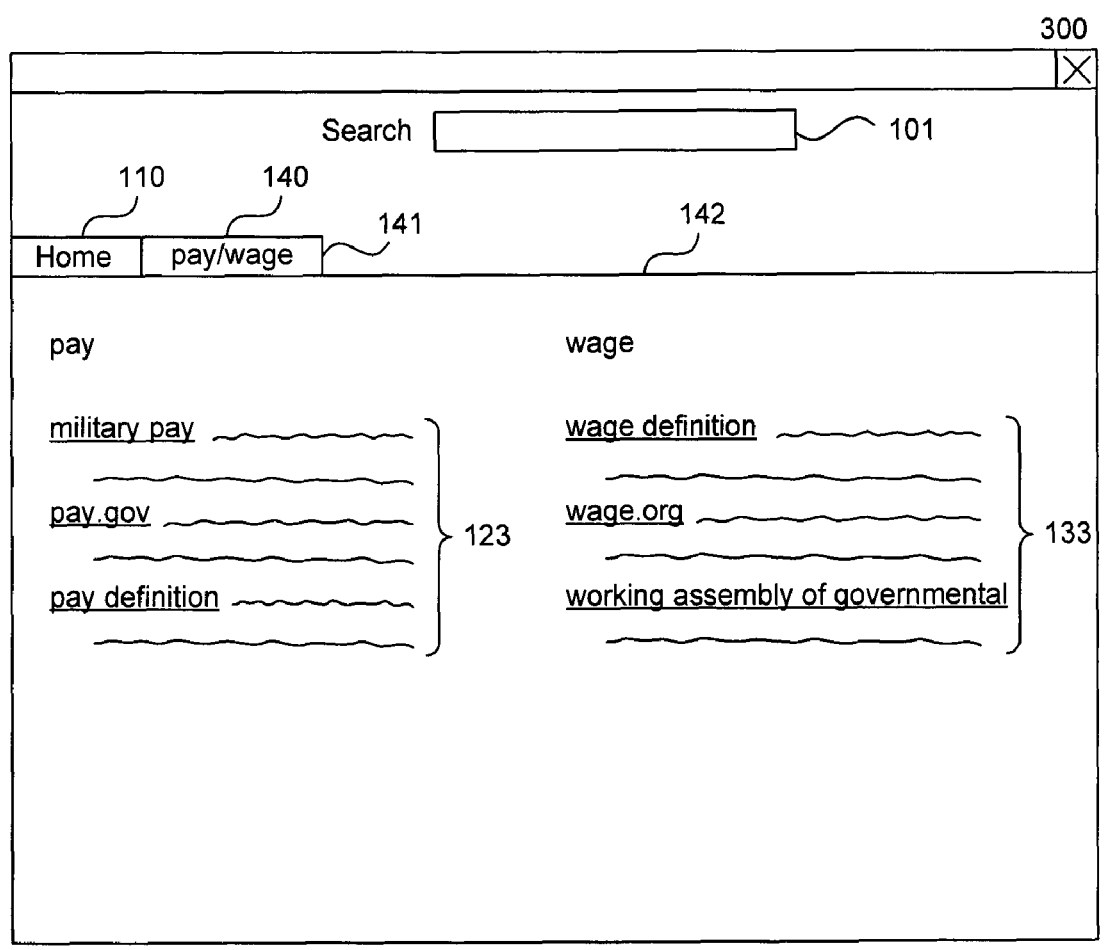
FIG. 3 is a display page that illustrates a TDI with a combined tab in some embodiments.

FIG. 3 is a display page that illustrates a TDI with a combined tab in some embodiments. Display page 300 includes a search area 101, a home tab 110, and a combined tab 140. The combined tab includes a tab name portion 141 and a tab content portion 142. The tab name portion includes identifying information derived from the identifying information of the separate tabs that are combined. In this example, the identifying information (i.e., "pay/wage") in the tab name portion 141 is a concatenation of the identifying information of the separate tabs (i.e., "pay" and "wage"). The tab content portion 142 contains the search result portion 123 and the search result portion 133 from the separate tabs that have been combined. The combinable TDI system may support the combining of any number of tabs into combined tabs. For example, if the user were to submit a new search for the query "salary," the combinable TDI system would create a new tab with a tab name portion containing the identifying information "salary." The user can then select that new tab name portion and drag and drop it over the tab name portion 141. The combinable TDI system then generates a combined tab with a tab name portion that contains the identifying information derived from all three tabs (e.g., "pay/wage/salary").

In some embodiments, the combinable TDI system allows the combined tabs to be uncombined, separated back out, or split into separate tabs. To separate a combined tab, the user may select the tab name portion of the combined tab and indicate to uncombine the tab such as by right clicking on the tab name portion with a pointing device. For example, if display page 300 is currently displayed, the user may right click on tab name portion 141. In such a case, display page 200 illustrates the results of the uncombined tabs. One skilled in the art will appreciate that the user may indicate to combine and uncombine tabs in many different ways. For example, to combine tabs, a user may select multiple tabs and then select a combine option from a menu. To uncombine tabs, the user may select a combined tab and then select an uncombine option from the menu.

Figure 4:
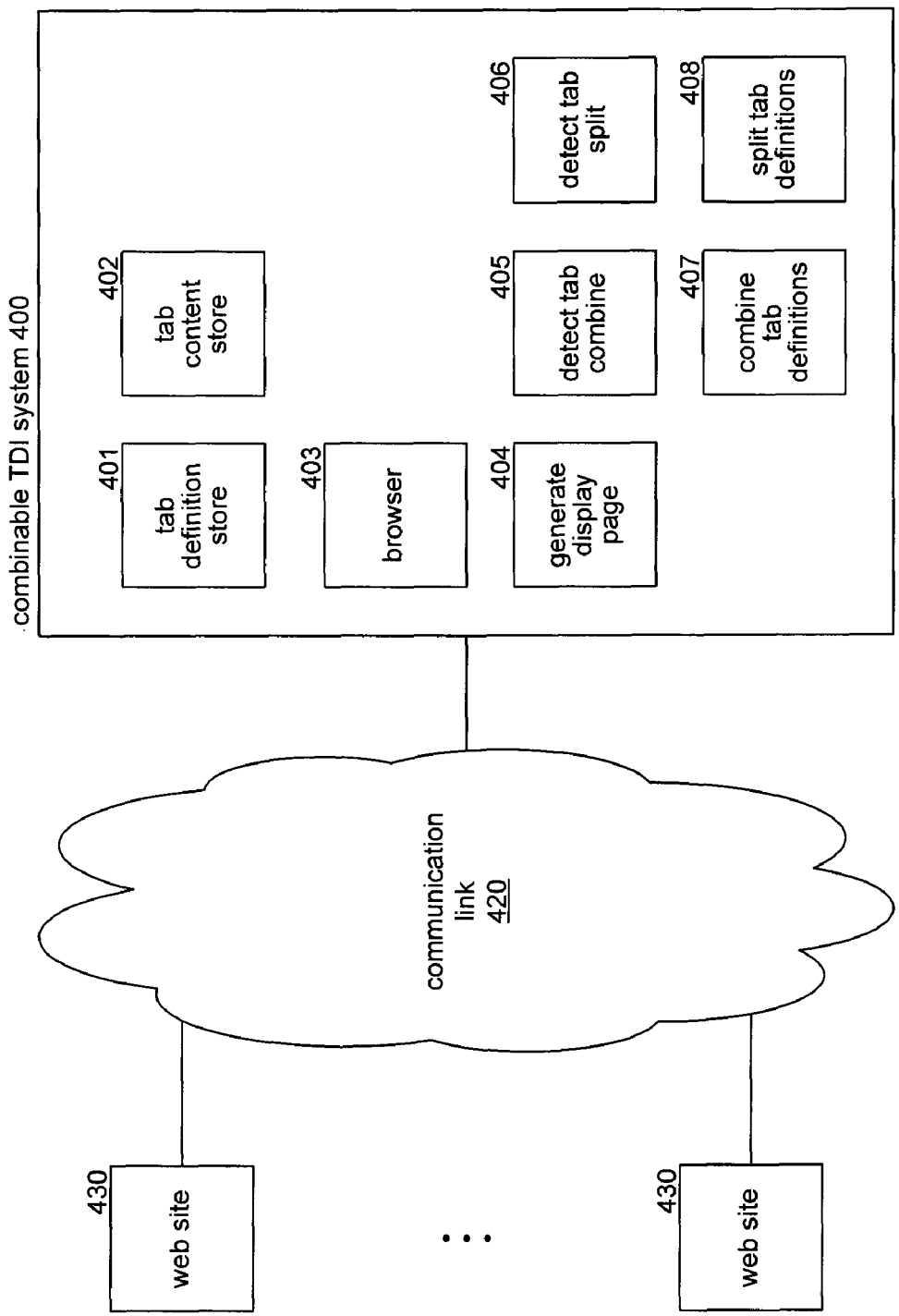
FIG. 4 is a block diagram that illustrates components of a combinable TDI system in some embodiments.

FIG. 4 is a block diagram that illustrates components of a combinable TDI system in some embodiments. The combinable TDI system 400 may be connected to various web sites 430, such as search engine services, via a communication link 420. The combinable TDI system may include a tab definition store 401, a tab content store 402, a browser component 403, a generate display page component 404, a detect tab combine component 405, a detect tab split component 406, a combine tab definitions component 407, and a split tab definitions component 408. The combinable TDI system may be an integrated part of the browser such that any tab of the browser can be combined. In some embodiments, the web pages of the web sites need not be modified to support the combining of tabs. In other embodiments, the web pages may be augmented to provide information to facilitate the combining of tabs. For example, the web pages may contain information indicating how to align the content of tabs that are to be combined. The web pages may, for example, identify a first row, a second row, and so on for alignment purposes. The tab definition store contains information defining each tab of the TDI. Each tab may be represented by its sub-tabs. If a tab is not a combined tab, then it has only one sub-tab. If, however, the tab is combined, then it will have multiple sub-tabs. Each sub-tab has an associated tab name and tab content, which are used to generate a separate tab or a combined tab. The tab content store includes the content for each tab. The browser may be a conventional browser that has been adapted to implement the combinable TDI system. The generate display page component is invoked to generate a display page that includes a TDI with tabs as defined by the tab definition store. The detect tab combine component is invoked when the browser detects that a user has indicated to combine tabs. The detect tab combine component invokes the combine tab definitions component to combine tabs. The detect tab split component is invoked when the browser detects that the user has indicated to split tabs. The detect tab split component invokes the split tab definitions component to split tabs.

Figure 5:
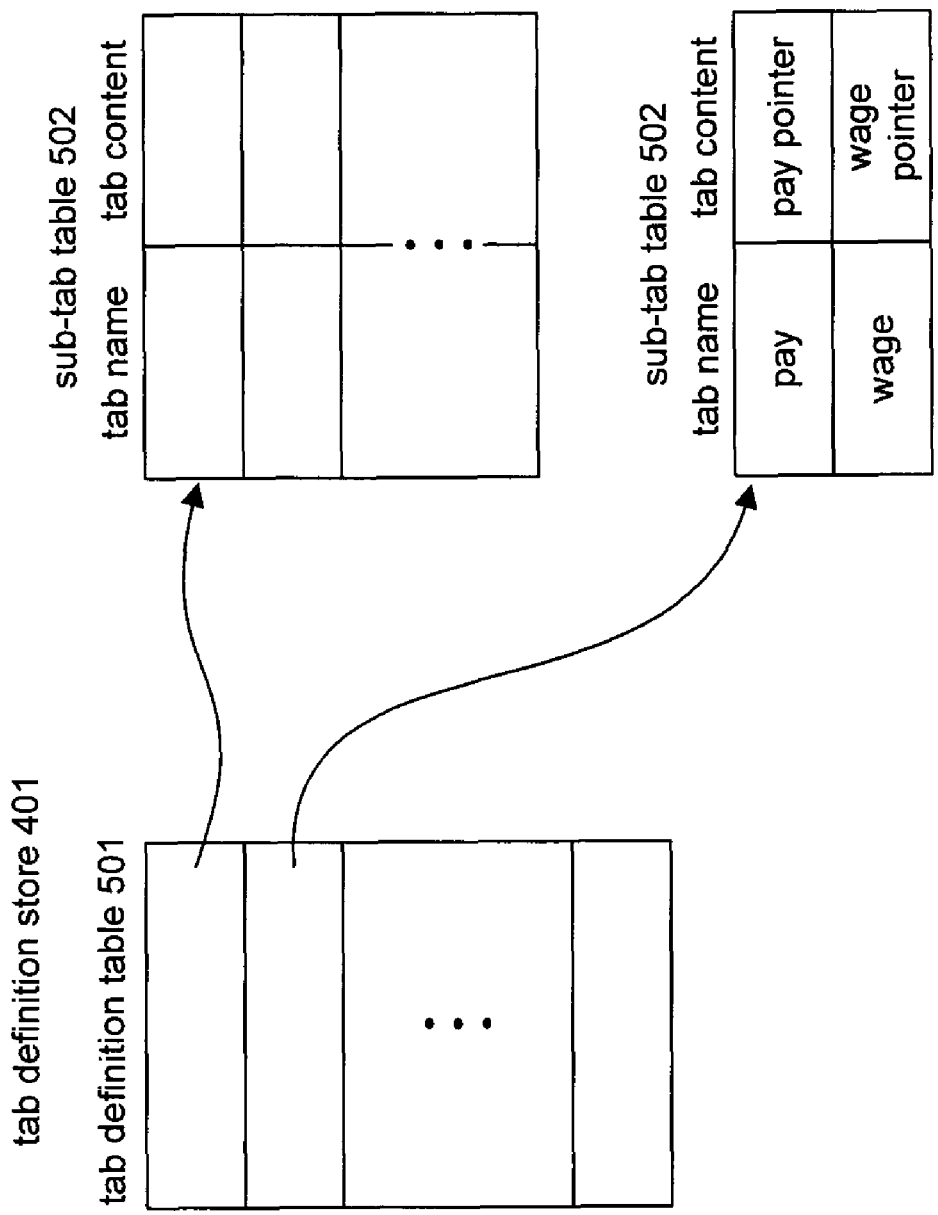
FIG. 5 is a block diagram that illustrates a logical organization of a tab definition store of the combinable TDI system in some embodiments.

FIG. 5 is a block diagram that illustrates a logical organization of a tab definition store of the combinable TDI system in some embodiments. The tab definition store 401 includes a tab definition table 501 with an entry for each separate tab and each combined tab that are displayed as part of the TDI. For example, the tab definition table for display page 100 would include an entry for home tab 110 and an entry for pay tab 120, display page 200 would include an entry for home tab 110, an entry for pay tab 120, and an entry for wage tab 130, and display page 300 would include an entry for home tab 110 and an entry for combined tab 140. Each entry points to a sub-tab table 502 that defines the sub-tab(s) corresponding to that tab. Each entry of a sub-tab table contains a tab name and a reference to the tab content. For example, the sub-table corresponding to the combined tab 140 of display page 300 contains an entry for a sub-tab corresponding to pay tab 120 and an entry for a sub-tab corresponding to wage tab 130.

The computing device on which the combinable TDI system is implemented may include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the combinable TDI system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the combinable TDI system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The combinable TDI system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the combinable TDI system may be implemented on a server that provides a user interface to a client computing device. In particular, the combinable TDI system may be adapted as a general-purpose user interface unrelated to browsers and web pages.

Figure 6:
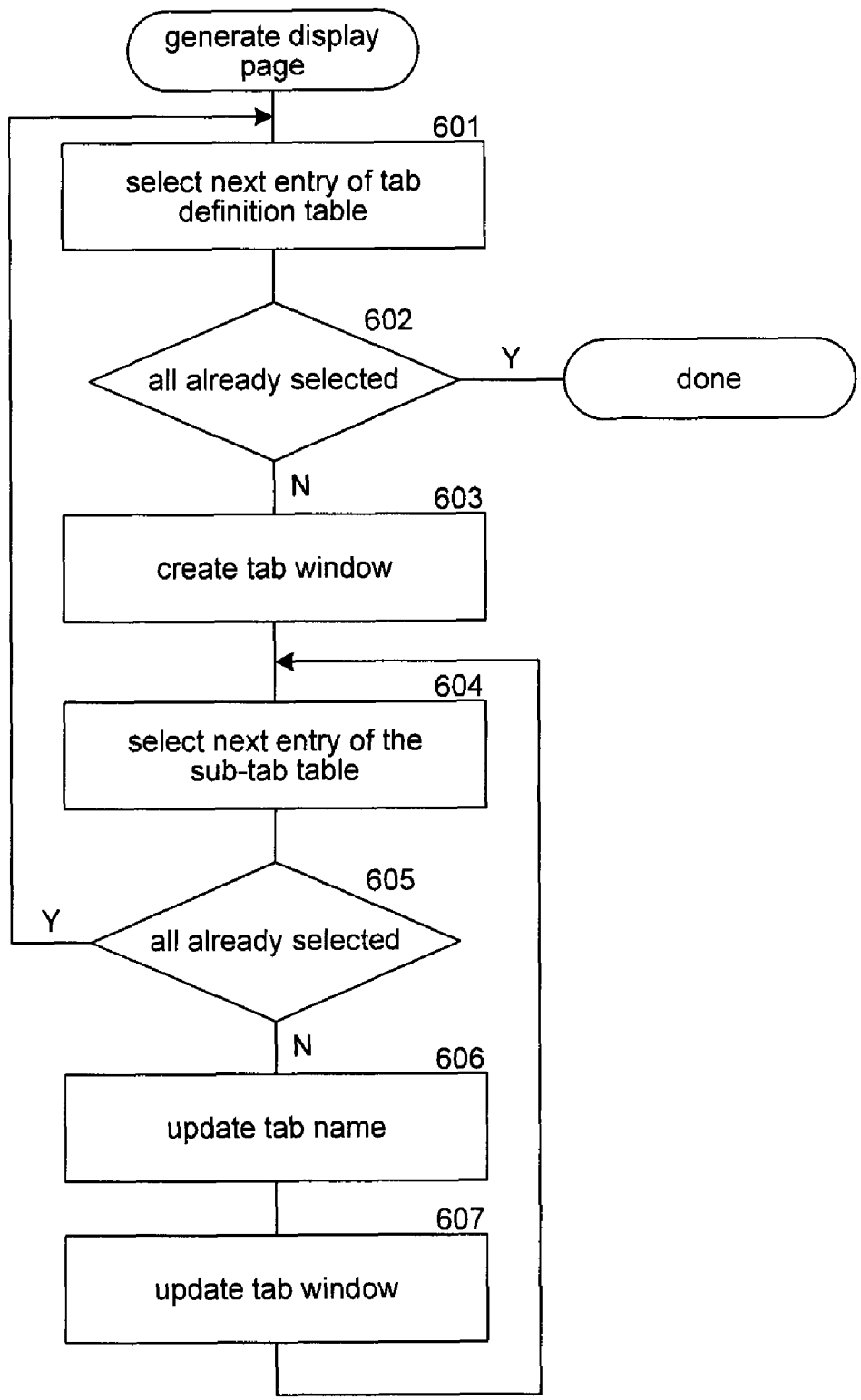
FIG. 6 is a flow diagram that illustrates the processing of a generate display page component of the combinable TDI system in some embodiments.

FIG. 6 is a flow diagram that illustrates the processing of a generate display page component of the combinable TDI system in some embodiments. The component generates the TDI portion of a display page. In blocks 601-607, the component loops selecting each entry of the tab definition table and generating a tab for that entry. In block 601, the component selects the next entry of the tab definition table. In decision block 602, if all the entries have already been selected, then the component completes, else the component continues at block 603. In block 603, the component creates a tab window for the selected entry. In blocks 604-607, the component loops selecting each entry of the sub-tab table for the selected entry of the tab definition table. In block 604, the component selects the next entry of the sub-tab table. In decision block 605, if all the entries of the sub-tab table have already been selected, then the component loops to block 601 to select the next entry of the tab definition table, else the component continues at block 606. In block 606, the component updates the tab name of the created tab window based on the tab name of the selected entry (e.g., concatenates the tab name to the current tab name of the tab window). In block 607, the component updates the tab window with the tab content of the selected entry of the sub-tab table and loops to block 604 to select the next entry of the sub-table.

Figure 7:
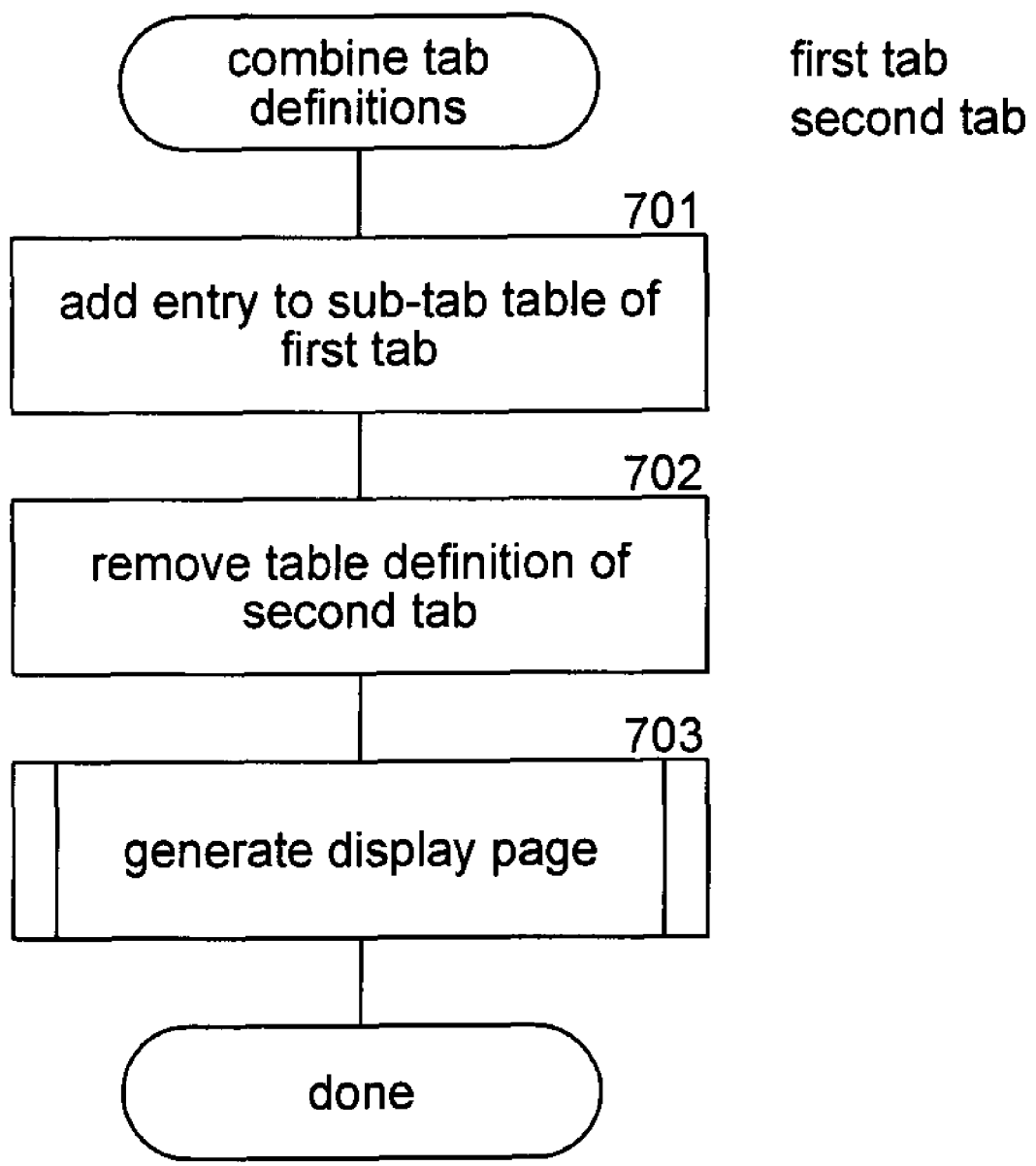
FIG. 7 is a flow diagram that illustrates the processing of the combine tab definitions component of the combinable TDI system in some embodiments.

FIG. 7 is a flow diagram that illustrates the processing of the combine tab definitions component of the combinable TDI system in some embodiments. The component is invoked when the combinable TDI system detects that the user wants to combine tabs. The component is passed an indication of a first tab and a second tab that are to be combined. In block 701, the component adds to the sub-tab table for the first tab an entry corresponding to the second tab. In block 702, the component removes the entry from the tab definition table corresponding to the second tab. In block 703, the component invokes the generate display page component to generate a TDI portion of the display page based on the combined definitions. The component then completes.

Figure 8:
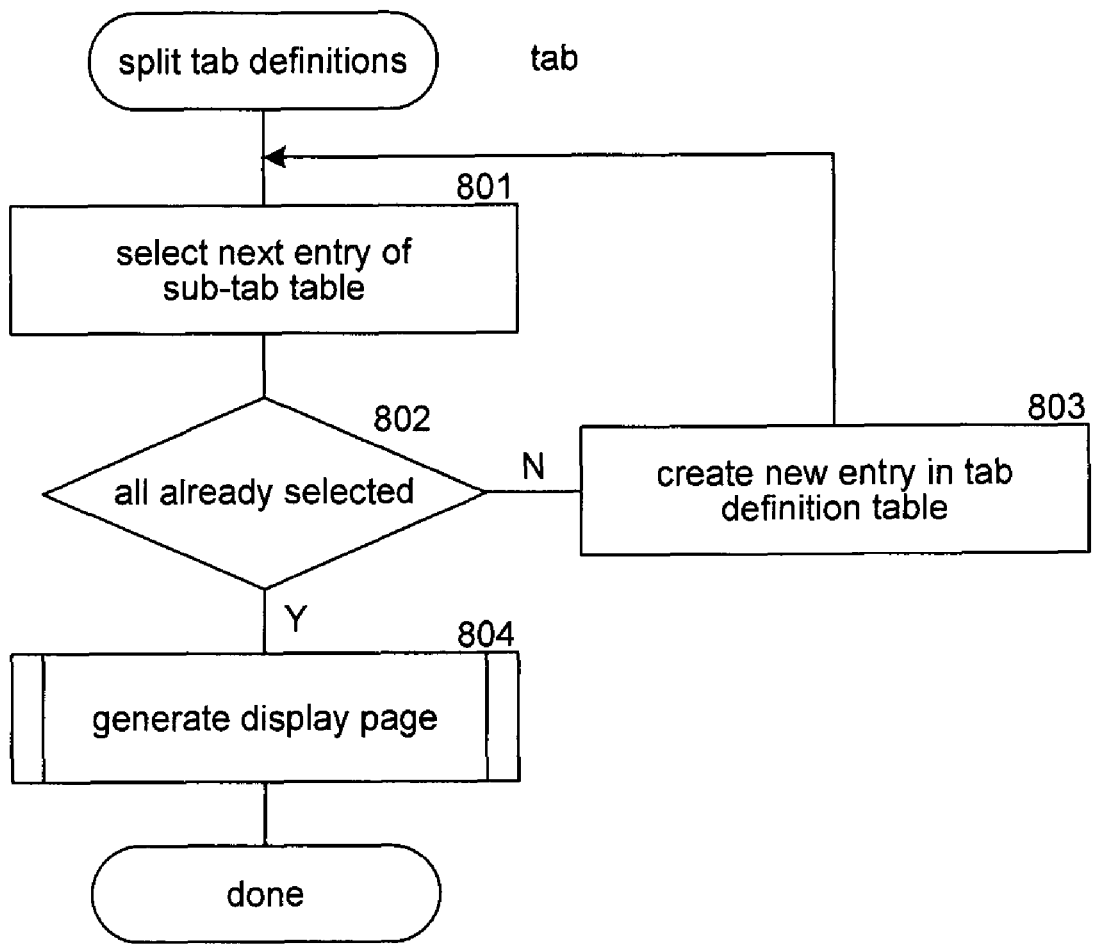
FIG. 8 is a flow diagram that illustrates the processing of the split tab definitions component of the combinable TDI system in some embodiments.

FIG. 8 is a flow diagram that illustrates the processing of the split tab definitions component of the combinable TDI system in some embodiments. The component is invoked when the combinable TDI system detects that the user wants to split tabs. The component is passed an indication of the tab to be split. In block 801, the component selects the next entry of the sub-tab table corresponding to the tab to be split, starting with the second entry. The first entry will remain and correspond to the single sub-tab of that tab. In decision block 802, if all the entries have already been selected, then the component continues at block 804, else the component continues at block 803. In block 803, the component creates a new entry in the tab definition table corresponding to the selected entry of the sub-tab table and then loops to block 801 to select the next entry of the sub-tab table. In block 804, the component invokes the generate display page component to generate a TDI portion of the display page based on the split definitions. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, after combining tabs, the combinable TDI component may still display separate tabs for each tab along with the combined tab. The combinable TDI component may provide an option to keep or remove separate tabs for tabs that have been combined. Accordingly, the invention is not limited except as by the appended claims.

We claim:

1. A method in a computing system for combining tabs of a tabbed document interface portion of a display page, the method comprising:
   providing a tab definition store that defines, for each tab of the tabbed document interface portion, a tab definition that defines one or more sub-tabs of the tab, each sub-tab having a tab name and tab content, the tab content of a sub-tab of a tab being derived from a web page that is augmented with alignment information indicating how to align that tab content with the tab content of another sub-tab of that tab;
   generating the tabbed document interface portion by, for each tab definition, generating a tab name for that tabbed document interface portion that is derived from the tab names of the sub-tabs of the tab and a tab window of the tabbed document interface portion that combines the tab content of the sub-tabs in accordance with the alignment information of the tab definition;
   displaying the tabbed document interface portion having the generated tab name and tab window;
   when a user indicates to split a combined tab,
      updating the tab definition store to indicate that the sub-tabs of the combined tab have been split; and
      regenerating and redisplaying the tabbed document interface portion to display the split tabs; and
   when a user indicates to combine tabs,
      updating the tab definition store to indicate that the tabs have been combined as sub-tabs of a combined tab; and
      regenerating and redisplaying the tabbed document interface portion to display the combined tabs.

2. The method of claim 1 wherein a user indicates to combine tabs by dragging and dropping an indication of a first tab over a second tab wherein the first tab and the second tab are combined.

3. The method of claim 1 wherein the tab contents are combined by arranging the tab contents horizontally.

4. The method of claim 3 including adding a scroll bar to a tabbed document interface portion for scrolling tab contents horizontally.

5. The method of claim 1 wherein when a tab has multiple sub-tabs, the tab contents of the sub-tabs are arranged as rows and columns within the tabbed document interface portion.

6. The method of claim 1 wherein the user indicates to split a combined tab by selecting an indication of the combined tab and indicating to split the selected combined tab.

7. A computer-readable storage device encoded with computer-executable instructions for controlling a computing system to combine tabs of a tabbed document interface portion of a display page, by a method comprising:
   providing a tab definition store that defines, for each tab of the tabbed document interface portion, a tab definition that defines one or more sub-tabs of the tab, each sub-tab having a tab name and tab content, the tab content of a sub-tab of a tab being derived from a web page that is augmented with alignment information indicating how to align that tab content with the tab content of another sub-tab of that tab;
   generating the tabbed document interface portion by, for each tab definition, generating a tab name for that tabbed document interface portion that is derived from the tab names of the sub-tabs of the tab and a tab window of the tabbed document interface portion that combines the tab content of the sub-tabs in accordance with the alignment information of the tab definition;
   displaying the tabbed document interface portion having the generated tab name and tab window;
   when a user indicates to split a combined tab,
      updating the tab definition store to indicate that the sub-tabs of the combined tab have been split; and
      regenerating and redisplaying the tabbed document interface portion to display the split tabs; and
   when a user indicates to combine tabs,
      updating the tab definition store to indicate that the tabs have been combined as sub-tabs of a combined tab; and
      regenerating and redisplaying the tabbed document interface portion to display the combined tabs.

8. The computer-readable storage device of claim 7 wherein a user indicates to combine tabs by dragging and dropping an indication of a first tab over a second tab wherein the first tab and the second tab are combined.

9. The computer-readable storage device of claim 7 wherein the tab contents are combined by arranging the tab contents horizontally.

10. The computer-readable storage device of claim 9 including adding a scroll bar to a tabbed document interface portion for scrolling tab contents horizontally.

11. The computer-readable storage device of claim 7 wherein when a tab has multiple sub-tabs, the tab contents of the sub-tabs are arranged as rows and columns within the tabbed document interface portion.

12. The computer-readable storage device of claim 7 wherein the user indicates to split a combined tab by selecting an indication of the combined tab and indicating to split the selected combined tab.

13. A computing system for combining tabs of a tabbed document interface portion of a display page, comprising:
   a tab definition store that defines, for each tab of the tabbed document interface portion, a tab definition that defines one or more sub-tabs of the tab, each sub-tab having a tab name and tab content, the tab content of a sub-tab of a tab being derived from a web page that is augmented with alignment information indicating how to align that tab content with the tab content of another sub-tab of that tab;
   a memory storing computer-executable instructions of:
      a component that generates the tabbed document interface portion by, for each tab definition, generating a tab name for that tabbed document interface portion that is derived from the tab names of the sub-tabs of the tab and a tab window of the tabbed document interface portion that combines the tab content of the sub-tabs in accordance with the alignment information of the tab definition;
      a component that displays the tabbed document interface portion having the generated tab name and tab window;
      a component that, when a user indicates to split a combined tab,
         updates the tab definition store to indicate that the sub-tabs of the combined tab have been split; and
         regenerates and redisplays the tabbed document interface portion to display the split tabs; and
      a component that, when a user indicates to combine tabs,
         updates the tab definition store to indicate that the tabs have been combined as sub-tabs of a combined tab; and regenerates and redisplays the tabbed document interface portion to display the combined tabs; and a processor that executes the computer-executable instructions stored in the memory.

14. The computing system of claim 13 wherein a user indicates to combine tabs by dragging and dropping an indication of a first tab over a second tab wherein the first tab and the second tab are combined.

15. The computing system of claim 13 wherein the tab contents are combined by arranging the tab contents horizontally.

16. The computing system of claim 15 including a component that adds a scroll bar to a tabbed document interface portion for scrolling tab contents horizontally.

17. The computing system of claim 13 wherein when a tab has multiple sub-tabs, the tab contents of the sub-tabs are arranged as rows and columns within the tabbed document interface portion.

18. The computing system of claim 13 wherein the user indicates to split a combined tab by selecting an indication of the combined tab and indicating to split the selected combined tab.

\* \* \* \* \*